(12) United States Patent
Kaufman et al.

(10) Patent No.: US 6,827,751 B2
(45) Date of Patent: Dec. 7, 2004

(54) THERMODYNAMIC ACCELERATOR/ GASIFIER

(76) Inventors: Thomas W. Kaufman, 1435 E. Park Rd., Panama City, FL (US) 32404; Verner Christensen, 1435 E. Park Rd., Panama City, FL (US) 32404-9015

( * ) Notice: Subject to any disclaimer, the term of this patent is extended or adjusted under 35 U.S.C. 154(b) by 0 days.

(21) Appl. No.: 10/695,230

(22) Filed: Oct. 28, 2003

(65) Prior Publication Data

US 2004/0083651 A1 May 6, 2004

Related U.S. Application Data

(60) Provisional application No. 60/421,676, filed on Oct. 28, 2002.

(51) Int. Cl.[7] .................................................. C10J 3/68
(52) U.S. Cl. ............................. 48/77; 48/61; 48/62 R; 48/71; 48/72; 48/73; 48/89; 48/98; 48/99; 48/100; 48/101; 48/111; 48/112; 48/93; 48/94; 48/95; 48/119; 48/127.9
(58) Field of Search ...................... 48/61, 62 R, 71–73, 48/77, 89, 98–101, 111, 112, 93–95, 119, 127.9, 198.1, 215, 200–202, 209–213, 214 A, 214 R, 197 FM

(56) References Cited

U.S. PATENT DOCUMENTS 5,950,547 A   9/1999   Wachendorfer 6,216,613 B1   4/2001   Wachendorfer

*Primary Examiner*—Walter D. Griffin
*Assistant Examiner*—Basia Ridley
(74) *Attorney, Agent, or Firm*—John Wiley Horton

(57) ABSTRACT

An apparatus which is capable of supporting a process for gasifying a variety of hydrocarbon-containing materials. The resulting hydrogen-containing gas is suitable for use in various combustion processes and for petrochemical processes. A hydrocarbon-containing material is mixed with natural gas (or other suitable hydrocarbon gas) under pressure. The suspended material and gas are then injected under pressure into an acceleration/gasification tube. Intense heat (provided by an external energy source) is applied to the mixture as it travels through this tube, resulting in the cracking of the hydrocarbon chains and the release of additional energy. The released bond energy, along with the addition of the external energy, rapidly expands the gas and causes the velocity of the moving mixture to rise sharply as it proceeds down the tube. The acceleration/gasification tube is connected to a diffuser, which is essentially an expansion nozzle with a series of heat exchangers to cool the rapidly expanding gas. An evacuation pump is attached to the diffuser to extract the cooled gas and maintain flow in the system.

21 Claims, 7 Drawing Sheets

THERMODYNAMIC ACCELERATOR/GASIFIER

CROSS-REFERENCES TO RELATED APPLICATIONS

This is a non-provisional application claiming the benefit of an earlier-filed provisional application having Application Ser. No. 60/421,676. The provisional application was filed on Oct. 28, 2002. It listed the same inventors as this application.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of gasification of hydrocarbon-containing solids and liquids. More specifically, the invention comprises a device for gasifying hydrocarbon materials and rendering them suitable for use in combustion processes or petrochemical processes.

2. Description of the Related Art

Ideal combustion often requires that the fuel material be ignited as a gas, liquid, or finely particulated solid. When this is true, advanced technology can be employed to regulate the combustion process and eliminate or reduce the production of pollutants. Complex solids can then be combusted in a controlled fashion.

Many solid hydrocarbon fuels are available at relatively low cost. One good example is coal, which exists in a wide variety in terms of concentration and the presence of unwanted impurities. Coal is typically burned in power plants to produce electricity. Unfortunately, it is really only suitable for use in large fixed installations (power plants) or large and complex moving installations (coal-fired ships or steam locomotives). The use of coal in a smaller application—such an automobile—is impractical.

Several processes have been developed to convert solid coal into a more usable form—commonly known as "coal gasification." While these processes work, they often consume more energy in the conversion than is available in the final product. They have also been quite complex and difficult to maintain.

Processes to gasify other types of hydrocarbon-containing solids and liquids are also known in the prior art, typically concentrating on the recycling of used solids such as rubber tires and unrefined liquids such as crude oils. These processes have also been quite complex and of marginal economic worth.

BRIEF SUMMARY OF THE INVENTION

The present invention comprises an apparatus that supports a process which is capable of gasifying a variety of hydrocarbon-containing materials. The resulting gas is suitable for use in various combustion processes and for petrochemical processes. A hydrocarbon-containing material is mixed with natural gas (or other suitable hydrocarbon gas) under pressure. The suspended material and gas are then injected under pressure into an acceleration/gasification tube. Intense heat (provided by an external energy source) is applied to the mixture as it travels through this tube, resulting in the cracking of the hydrocarbon chains and the release of additional energy. The released bond energy, along with the addition of the external energy, rapidly expands the gas and causes the velocity of the moving mixture to rise sharply as it proceeds down the tube.

The acceleration/gasification tube is connected to a diffuser, which is essentially an expansion nozzle with a series of heat exchangers to cool the rapidly expanding gas. An evacuation pump is attached to the diffuser to extract the cooled gas and maintain flow in the system. The violent acceleration experienced by the mixture during its travel through the acceleration/gasification tube and subsequent expansion nozzle (together with the extreme heat) converts most of the hydrocarbon containing materials into hydrocarbon gas (as well as some pure hydrogen gas). The remaining solids are removed from the diffuser.

Figure 1:
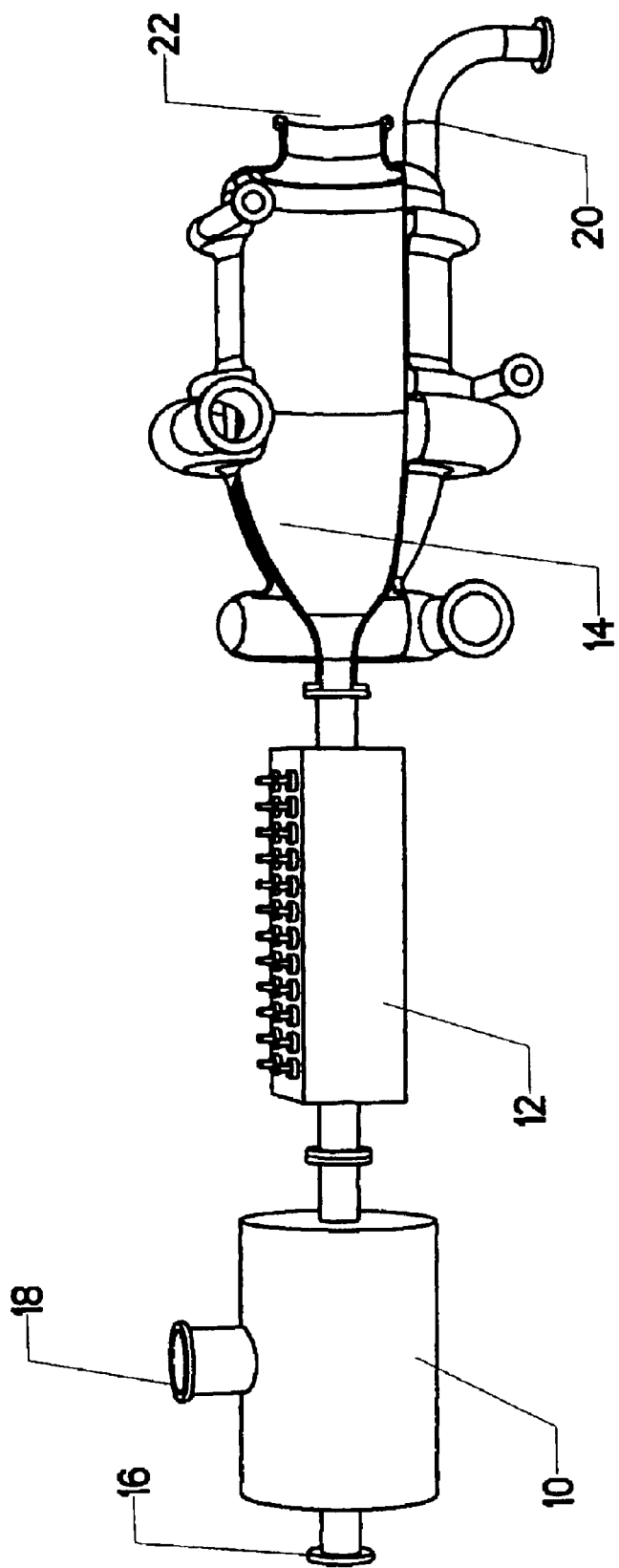
FIG. 1 is a perspective view, showing the central components of the present invention.

| REFERENCE NUMERALS IN THE DRAWINGS | | | |
|---|---|---|---|
| 10 | mixer | 12 | acceleration/gasification tube |
| 14 | gas diffuser | 16 | solids inlet |
| 18 | gas inlet | 20 | solids outlet |
| 22 | gas outlet | 24 | inlet |
| 26 | solids collection outlet | 28 | inlet flange |
| 30 | housing | 32 | heating elements |
| 34 | refractory shell | 36 | outlet flange |
| 38 | first expansion nozzle | 40 | inlet flange |
| 42 | second expansion nozzle | 44 | gas cooling jacket |
| 46 | gas inlet | 48 | gas outlet |
| 50 | liquid cooling jacket | 52 | liquid inlet |
| 54 | liquid outlet | 56 | outlet flange |
| 58 | coal and natural gas | 60 | cracked natural gas and softened coal |
| 62 | first acceleration phase | 64 | second acceleration phase |
| 66 | gasification phase | 68 | hot gas |
| 70 | hopper | 72 | material feeder |
| 74 | dryer | 76 | grinder/shredder |
| 78 | gas supply | 80 | cooled gas outlet |
| 82 | gas filter/cleaner | 84 | solids accumulator |
| 86 | extraction pump | 88 | powder intake |
| 90 | auger | 92 | rotor |
| 94 | drive shaft | 96 | support strut |
| 98 | shaft support | 100 | powder injector |
| 102 | acceleration nozzle | 104 | deceleration nozzle |
| 106 | solid injector | 108 | oxygen injector |
| 110 | external oxygen manifold | 112 | gas intake |
| 114 | gas exhaust | 116 | housing |
| 118 | throat | | |

DETAILED DESCRIPTION OF THE INVENTION

FIG. 1 depicts the central components of the present invention. The reader should appreciate that the device can be used to gasify solids, liquids, or a combination of the two (a "slurry"). In this initial example, a solid will be employed. Mixer 10 contains solids inlet 16 and gas inlet 18. A finely-ground hydrocarbon-containing solid is fed in through solids inlet 16. Natural gas is fed in through gas inlet 18. The entire system is pressurized. Thus, those skilled in the art will know that the gas must be fed in under pressure and the solid material must be fed in under pressure.

Mixer 10 disperses the hydrocarbon-containing solid into the natural gas, and delivers it through the connecting pipe into acceleration/gasification tube 12. The mixture is heated within acceleration/gasification tube 12. It undergoes a transformation process—which will be described subsequently—before passing through the connecting pipe into gas diffuser 14.

Figure 2:
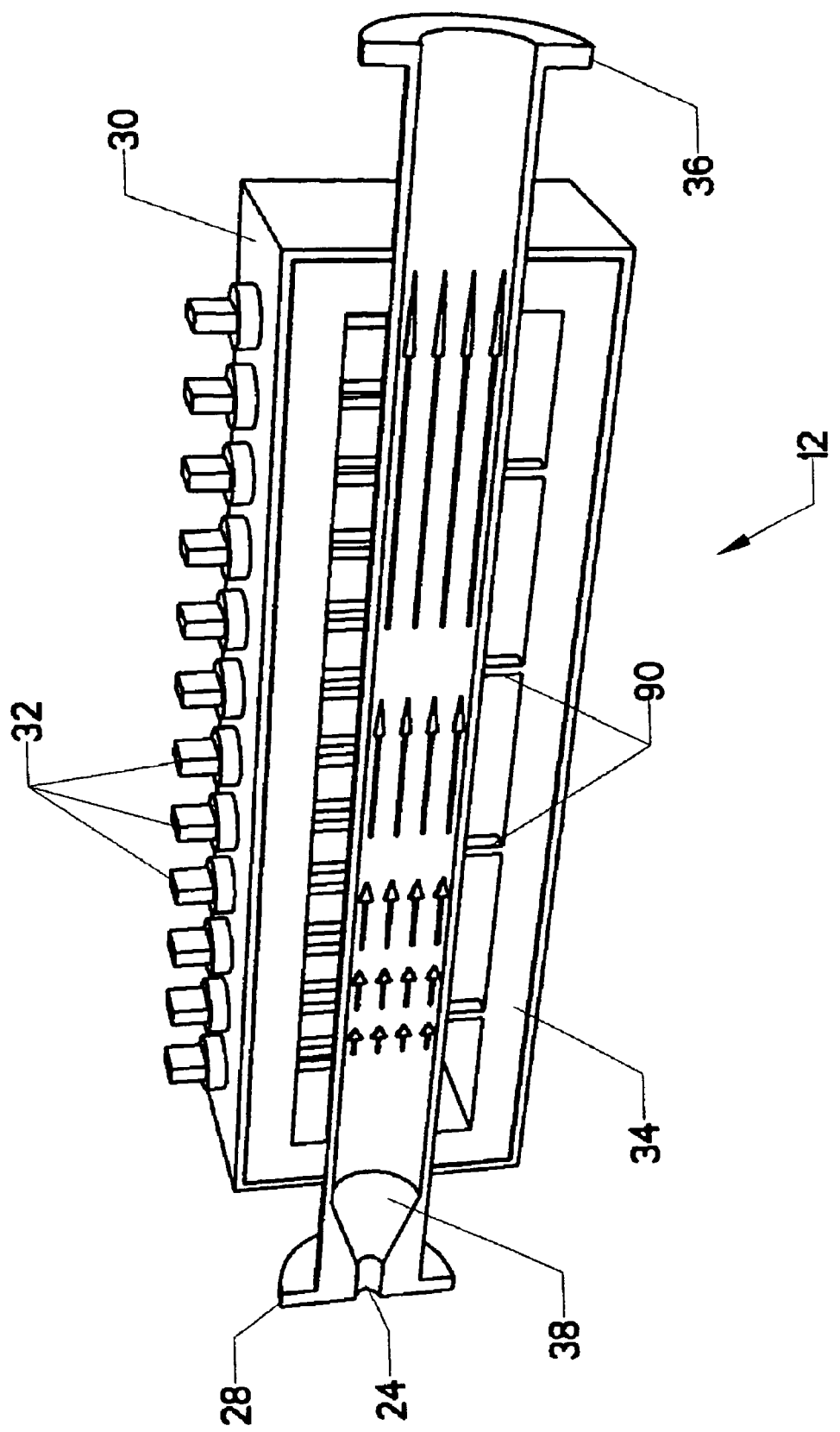
FIG. 2 is a perspective view with a cutaway, showing the construction of the acceleration/gasification tube.

FIG. 2 shows acceleration/gasification tube 12 sectioned in half to show its internal details. The unit is connected to mixer 10 by inlet flange 28. The mixture of hydrocarbon gas and solids is forced in through inlet 24. It then passes through first expansion nozzle 38. Most of the length of the tube is contained within housing 30. Refractory shell 34 surrounds the tube and insulates the metal comprising housing 30 from the extreme heat generated by a plurality of electrical heating elements 32.

A set of tube supports 90 holds the tube in position within housing 30. The wall of the cylindrical tube must have a high degree of thermal conductivity, in order to conduct heat to the gas and solids passing within the tube (essential to the processes occurring therein). It must also be capable of withstanding high temperatures. Outlet flange 36 connects acceleration/gasification tube 12 to gas diffuser 14.

The temperature within the refractory shell is typically maintained between 2200 and 3400 degrees Fahrenheit, depending on the material to be gasified. This heat is transferred to the mixture of gases and solids being forced through the tube.

Figure 4:
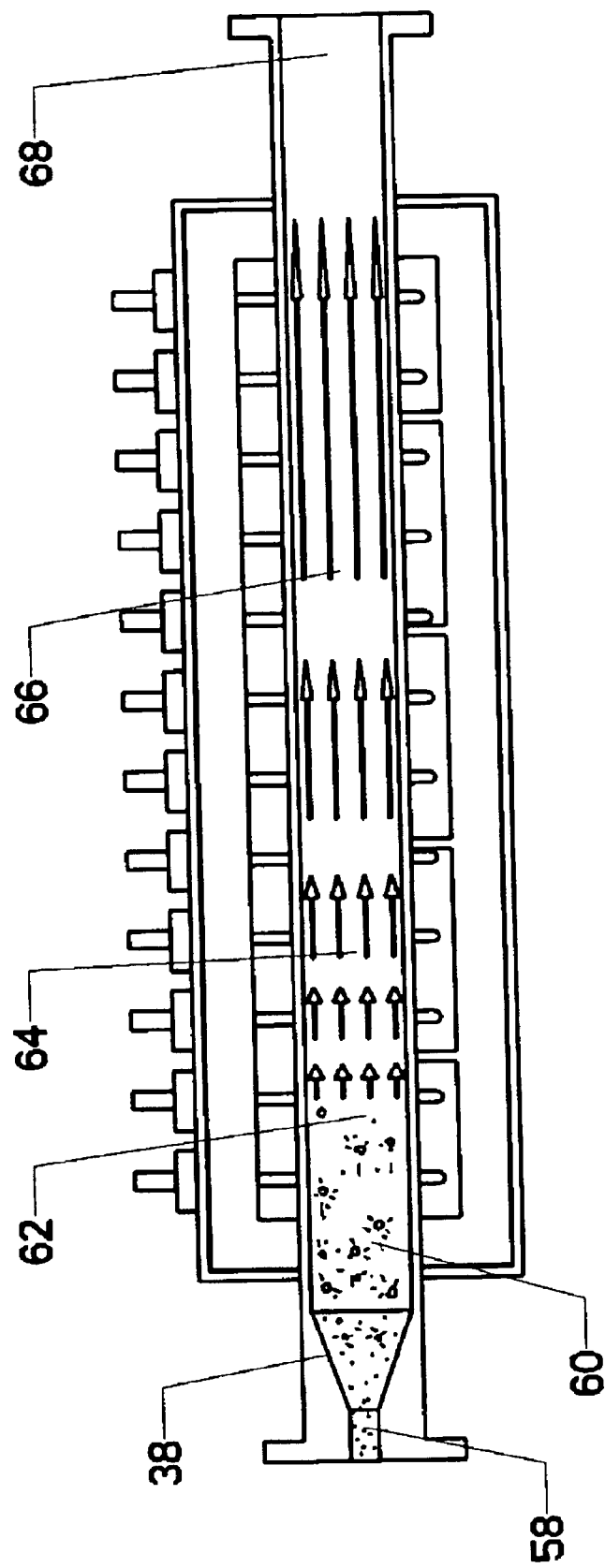
FIG. 4 is a sectional view, showing the operation of the acceleration/gasification tube.

FIG. 4 graphically depicts the processes occurring within acceleration/gasification tube 12. In this example, a mixture of finely-ground coal and natural gas 58 is forced into the tube from the left. It expands through first expansion nozzle 38. It is simultaneously heated. The heating adds energy to reach the activation energy needed to alter the chemical structure of the compounds present. The result is that the hydrocarbon chains within the natural gas are "cracked", thereby releasing some carbon bond energy. The coal is also broken into progressively finer particles ("softened") by the intense turbulent motion of the swirling gases. The added heat produces explosive acceleration, which further contributes to the carbon chain cracking process. The result is the region denoted as cracked natural gas and softened coal 60.

As the temperature of the mixture rises, the carbon bonds contained within the coal break, thereby releasing more potential energy. The sharply rising temperature causes the gas to expand—producing violent acceleration down the tube. This is denoted as first acceleration phase 62. The energy transferred to the mixture from heating elements 32 causes more expansion and further acceleration, denoted as second acceleration phase 64. The gases can exceed the speed of sound, forming shock waves as illustrated. A violently rotational flow typically develops as the gas accelerates down the tube.

The hydrocarbon chains within the coal ultimately break into their constituent elements, as do the hydrocarbon chains within the natural gas. This action occurs through the region marked gasification phase 66. The result is the escape of hot gas 68 out the right end of the assembly at high velocity. This hot gas, at this stage, may be composed mostly of hydrogen. Shorter-chain hydrocarbon gases may also be present (methane, ethane, etc.). Those skilled in the art will also realize that a substantial quantity of free electrons will be present (so long as the gas remains at highly the elevated temperature).

Figure 3:
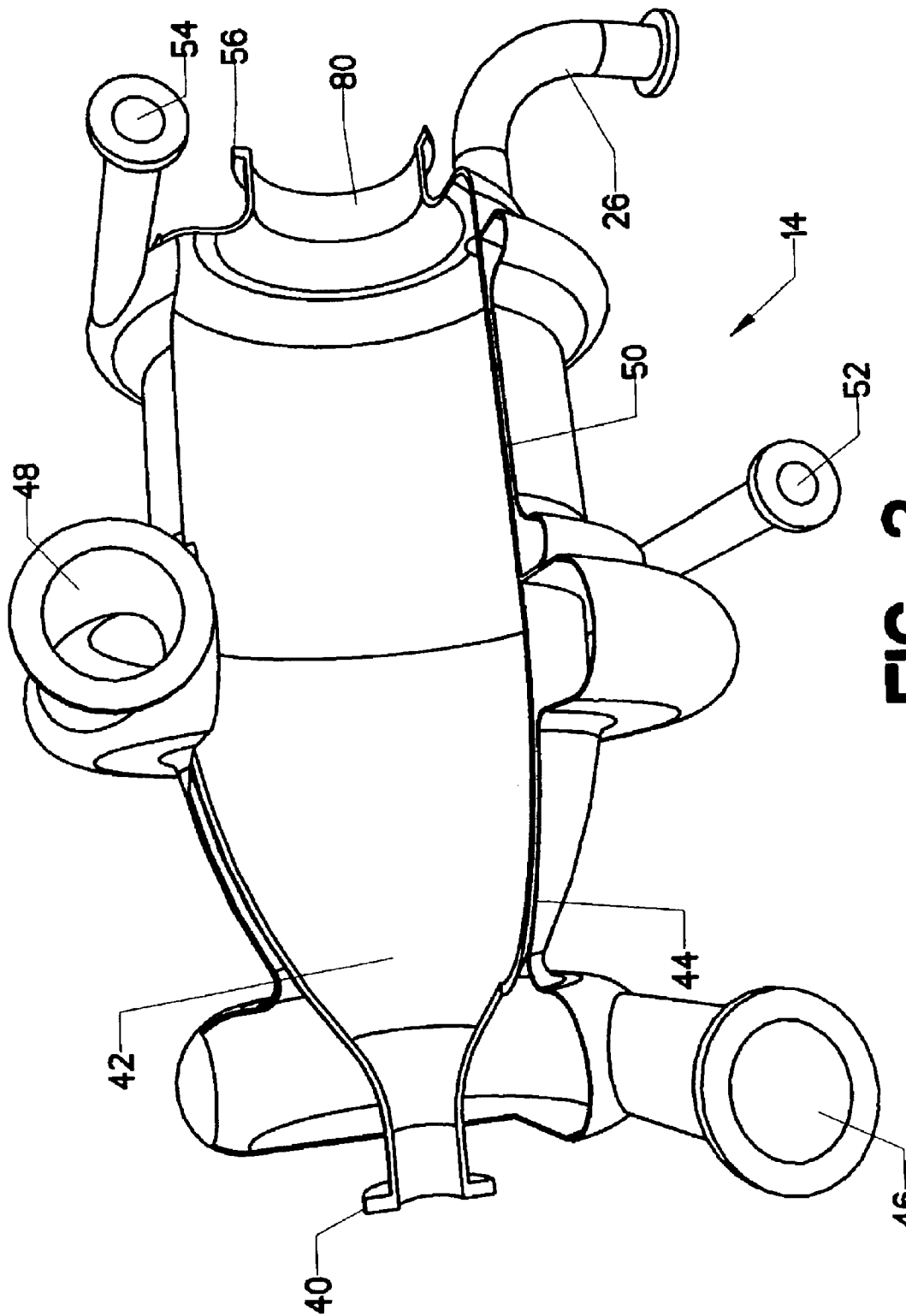
FIG. 3 is a perspective view with a cutaway, showing the construction of the gas diffuser.

The goal of the device is to provide a continuous process. Thus, the hot gas produced must be removed and collected. It must first be cooled, however. FIG. 3 illustrates the device intended to accomplish this task. Gas diffuser 14 assumes the form of an enclosed expansion nozzle. It is connected to acceleration/gasification tube 12 by inlet flange 40. The hot gases entering the device expands through second expansion nozzle 42. This process expands and cools the hot gas.

Second expansion nozzle 42 is surrounded by gas cooling jacket 44. Cool gas is forced into the jacket through gas inlet 46. It flows around a circular manifold and is forced along the bell-shaped wall of second expansion nozzle 42, where it is eventually collected in a second circular manifold and extracted through gas outlet 48. The cooling gas, which may be ambient air, can be used as a heat source for another process or simply exhausted.

Although gas cooling jacket 44 removes considerable thermal energy from the expanded gas within gas diffuser 14, more energy must typically be removed prior to storing the gasified hydrocarbons. A second cooling stage is produced by liquid cooling jacket 50. A conductive liquid, such as water, is fed in through liquid inlet 52. The liquid flows around a circular manifold and through liquid cooling jacket 50. It is then collected in a second circular manifold and extracted through liquid outlet 54.

The cooled hydrocarbon gas is then extracted through cooled gas outlet 80. The gas may then be fed directly into a combustion process, or compressed and stored for later use. In either case, an extraction pump is generally attached to cooled gas outlet 80 (via outlet flange 56) in order to maintain flow in the system. Those skilled in the art will realize that the gas extraction can be accomplished using multiple pumps attached to multiple gas outlets.

Although nearly all of the hydrocarbon-containing solid will be converted to a gas, some solid materials (such as silicon) will remain. These materials will generally collect in the bottom of gas diffuser 14. Solids collection outlet 26 is provided for the removal of these materials. It is attached to an accumulation unit, from which the solids must periodically be collected.

Figure 5:
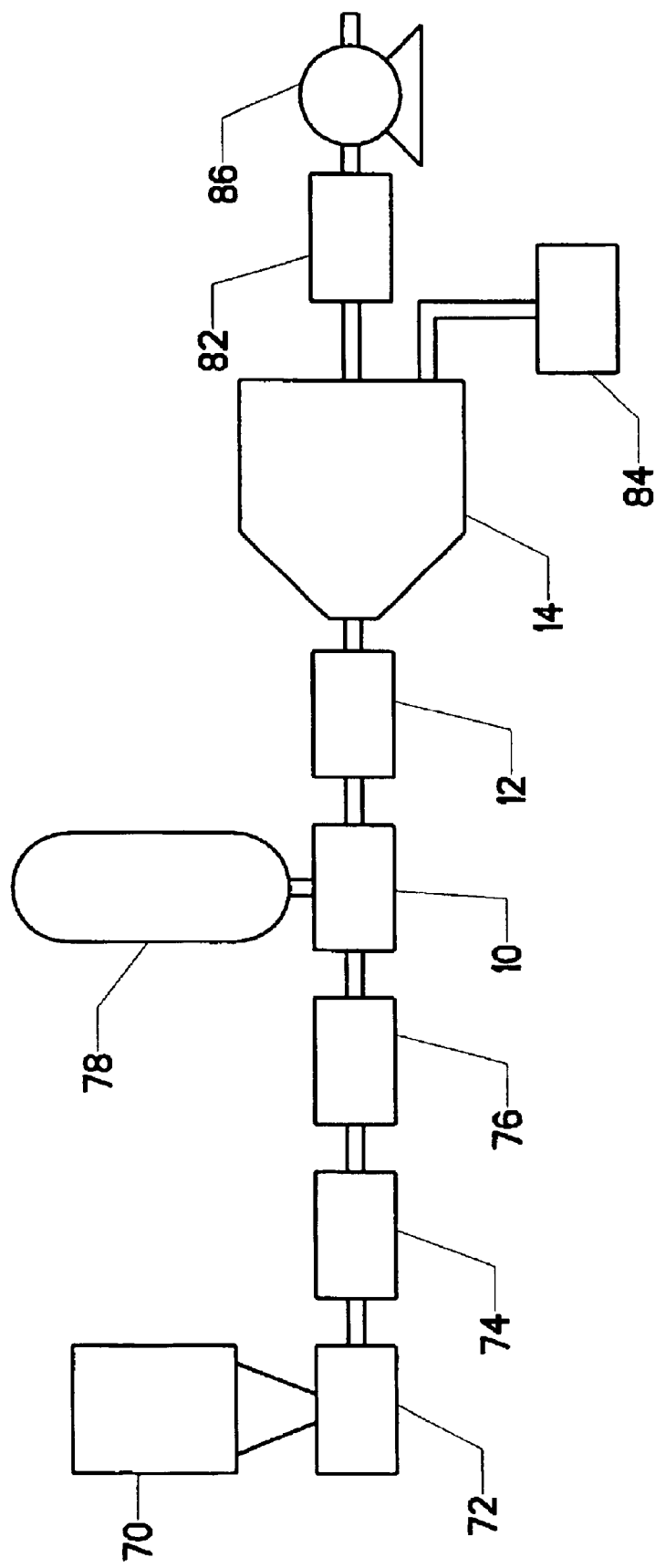
FIG. 5 is a schematic view, showing the interaction of the components comprising the present invention.

Continuing the example using coal, FIG. 5 schematically depicts the comprehensive process. Hopper 70 feeds the coal into material feeder 72. From there, depending on the moisture content, it may be fed into dryer 74. Once dried, the coal is passed into grinder/shredder 76, which produces fine particles within a specified size rage. These particles are then dispersed within the natural gas inside mixer 10 (with the gas coming from gas supply 78).

After leaving mixer 10, the mixture of gas and solids passes through acceleration/gasification tube 12. As explained previously, gasification takes place within this unit, with the result that a stream of very hot gas enters gas diffuser 14.

Those skilled in the art will know that the hydrocarbon gas present at this point in the process may be different from the one fed into the acceleration/gasification tube. The extreme temperatures and violent kinetic action tends to break down longer carbon chains ("cracking"). As an example, if the feed gas is propane (containing a molecule with a carbon chain which is three carbon atoms long), the gas may be very nearly transformed to free hydrogen and methane (containing only a single carbon atom per molecule) by the time it reaches the end of the acceleration/gasification tube. Both the input and output gas include hydrocarbon gases, but they are not the same gases. For purposes of clarity, the gas exiting the acceleration/gasification tube will be referred to as a "resultant gas."

Those skilled in the art will know that the predominance of free hydrogen gas will be present only at the highly elevated temperatures. As the gas cools, the free hydrogen will tend to recombine with the available carbon atoms to form hydrocarbon gases. Thus, it may be desirable to extract the free hydrogen gas before any significant cooling occurs. If the acceleration/gasification tube is configured to produce violently rotational flow, centrifugal separation devices can be used to extract the lighter hydrogen atoms from the heavier carbon atoms and hydrocarbon atoms (Those skilled in the art will realize that this process is imperfect, but it can be expected to extract the hydrogen gas with a tolerable amount of carbon and hydrocarbon impurities). This separation preferably occurs prior to the gas entering the diffuser, or only part way through the expansion portion of the diffuser. In such a case, a portion of the "resultant" gas does not pass completely through the diffuser.

Gas diffuser 14 is provided primarily to cool the resultant gas. The resultant gas passes through a second expansion nozzle (which may briefly accelerate the gas further, depending on the pressure maintained by the extraction pump). Looking again at FIG. 5, tThe gas can then be passed through gas filter/cleaner 82 (which may be needed to remove pollutants, depending on the feed material). Extraction pump 86 then recompresses the resultant gas and feeds it into storage containers.

Solids accumulator 84 is provided to collect unwanted solids. The accumulated materials must periodically be removed. This process must generally be performed while the system is shut-down, since solids accumulator 84 cannot be opened without disturbing the flow in the system.

Various other conventional components have not been illustrated. For instance, as explained previously, the solid material must be pressurized in order to feed into mixer 10. This pressurization component has not been illustrated.

Although coal has been used in the preceding example, other solid materials can be substituted. As a second example—used rubber tires can be employed as the hydrocarbon-containing solid. Different mechanical hardware is needed to shred used tires to an appropriate particle size, but the process is otherwise similar.

The process is not limited to the use of hydrocarbon-containing solids, however. Hydrocarbon-containing liquids, such as crude oil, can also be employed. In many respects the use of such a liquid simplifies the process, since it is easier to disperse the liquid into the natural gas than a finely ground solid. Combinations of liquids and solids are also possible. Finely ground coal can be mixed into crude oil to form a slurry, which is then dispersed into the natural gas and fed into acceleration/gasification tube 12. A slurry can also be made by mixing shredded rubber products with crude oil.

The components disclosed in detail can obviously be modified in many ways without changing the basic function of the overall device. As one example, electrical heating elements 32 could be replaced by gas burners. Likewise, a conventional gas to liquid heat exchanger (one type of "boiler") could be substituted for the complex form of gas diffuser 14. Some efficiency would obviously be lost, since the DeLaval-type expansion nozzle would not be present. So long as sufficient heat is extracted from the gasified hydrocarbons to allow their subsequent use, however, the loss of efficiency could be tolerated.

Figure 6:
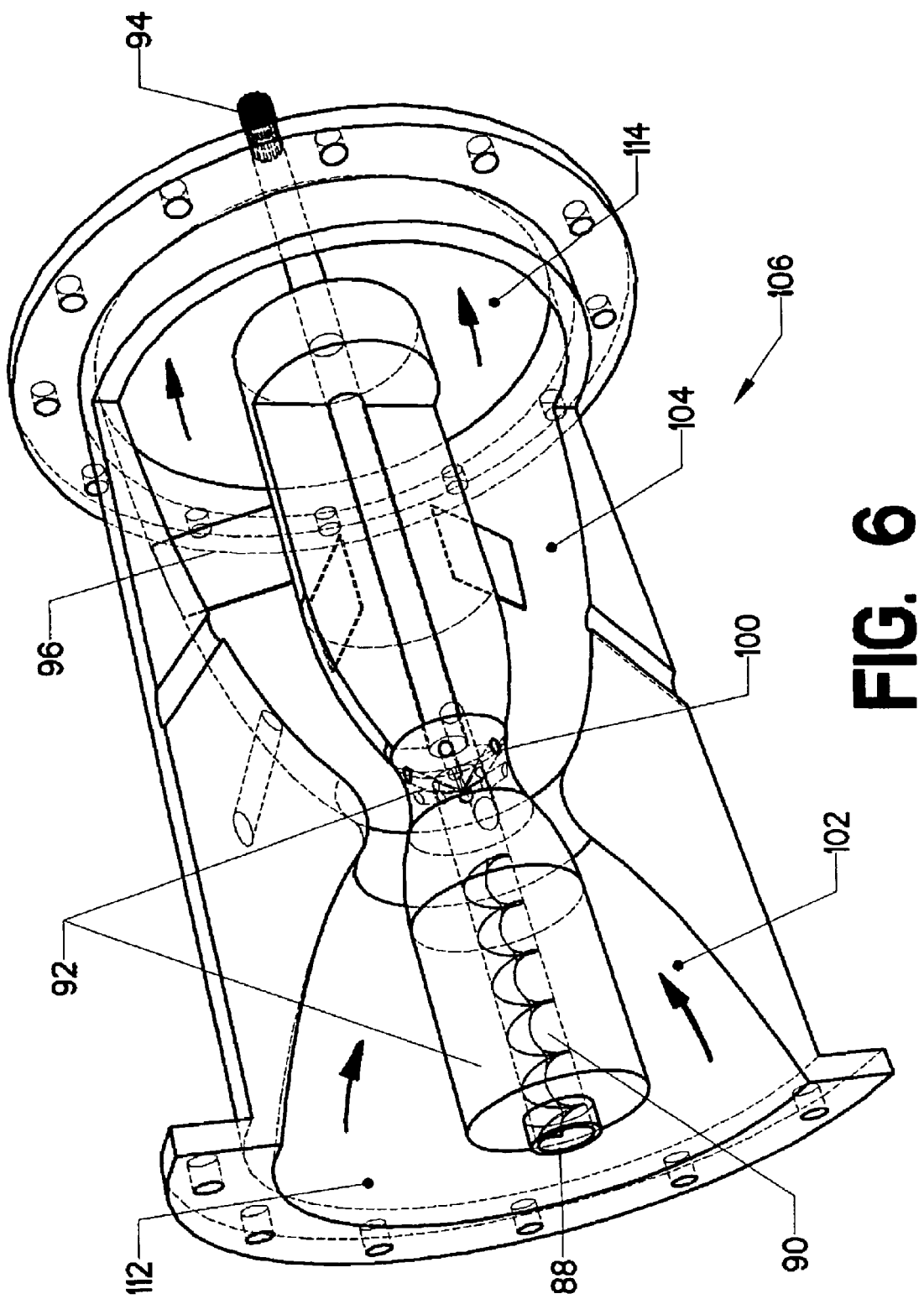
FIG. 6 is a perspective view with a cutaway, showing one type of solid injector used with the present invention.

Many different devices can be used to feed the solid and/or liquid hydrocarbon-containing materials into the gasifier. FIG. 6 shows solid injector 106, which would be contained within mixer 10. It is preferable to have the mixer generate a fast moving gas with an even dispersion of fine solid particles. Solid injector 106 is designed to accomplish this task. The unit is shown with a cutaway to reveal its internal features. A high pressure gas supply is connected to gas intake 112, typically using the flange provided. Housing 116, along with the internal components, serve to define an acceleration nozzle 102 followed by a deceleration nozzle 104. Gas flows through the device in the direction indicated by the arrows. Shaft support 98 is centrally fixed within deceleration nozzle 104 by radially-spaced support struts 96. Drive shaft 94 passes through and is supported by shaft support 98. It attaches to rotor 92 on its leading end.

Figure 7:
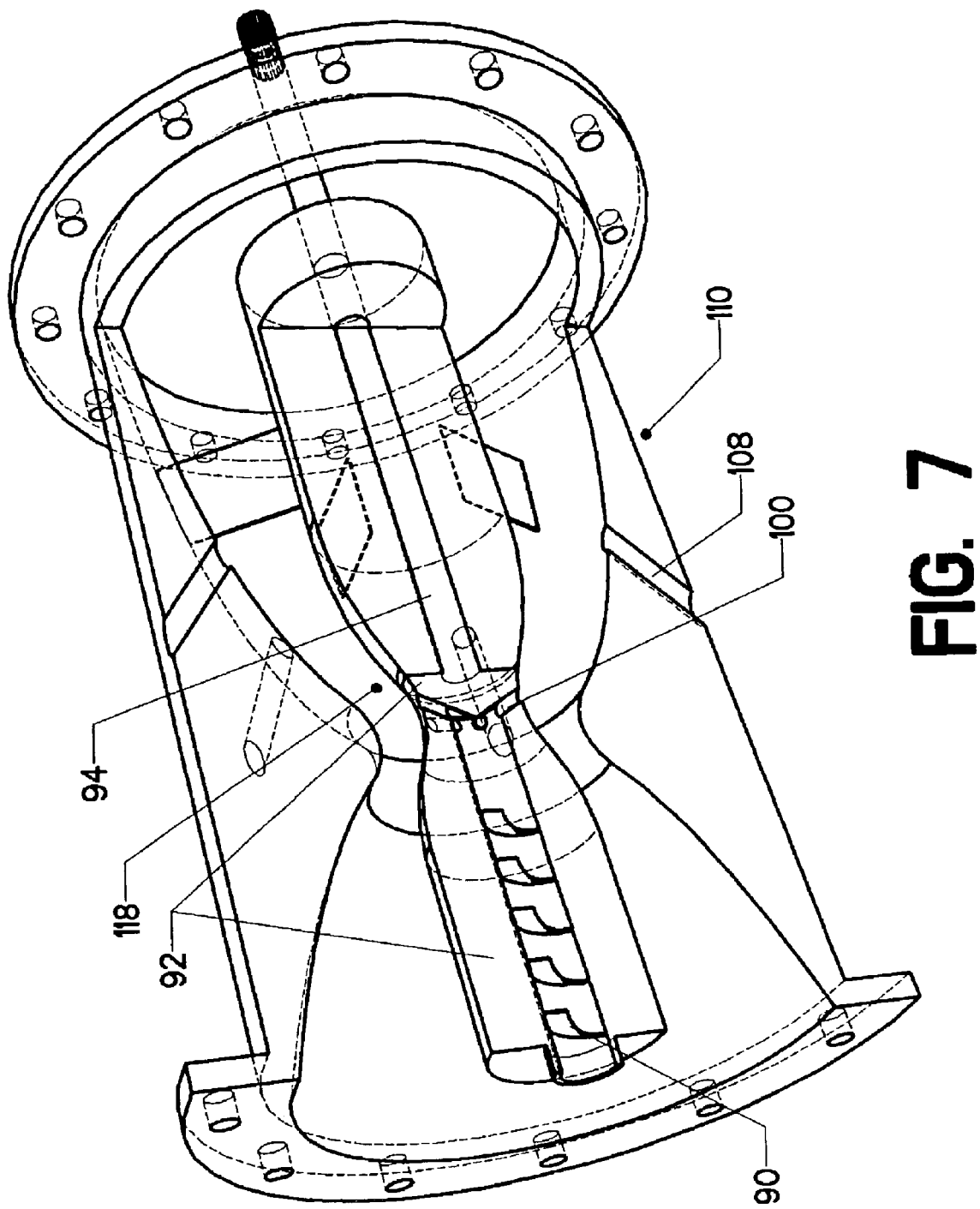
FIG. 7 is a perspective view with a cutaway, showing one type of solid injector used with the present invention.

Rotor 92 is spun rapidly by drive shaft 94. It features powder intake 88 near the center of its leading portion. Powder intake 88 rotatably connects to a tube supplying finely ground hydrocarbon-containing solids (This tube passes through the gas intake stream just upstream of the unit shown). Once the solid particles enter rotor 92, they are propelled aft by auger 90. FIG. 7 shows a cutaway through rotor 92 to reveal its internal details. The reader will observe how auger 90 (which is shown cutaway) propels the particles rearward and eventually out through a set of six powder injectors 100. As rotor 92 is rapidly spinning, the solid particles are thrown violently out through the powder injectors 102. The powder then enters the stream of rapidly moving gas, in close proximity to throat 108.

Those skilled in the art will realize that the gas velocity is maximized in the region of throat 118. The flow tends to be fully developed turbulent flow in this region as well, which promotes thorough mixing. By the time the gas decelerates through deceleration nozzle 104, the solid particles are thoroughly dispersed within the gas. A gearbox (typically a right-angle gearbox) is located in the gas flow stream just downstream of solid injector 106. It provides input power to the drive shaft. Just downstream of this gearbox, the gas flow enters acceleration/gasification tube 12.

The reader will recall from the prior explanation that the gas is heated within acceleration/gasification tube 12, using an external energy source. Some additional heat may be added by partially combusting the hydrocarbon gas, as it passes through acceleration/gasification tube 12. Oxygen, or some other suitable oxidizer, must be added if this function is desired. Looking again at FIG. 7, the reader will observe that radially-spaced oxygen injectors 108 are positioned to direct oxygen into deceleration nozzle 104. The oxygen can be supplied from external oxygen manifold 110, which is simply abounded cavity surrounding housing 116, into which pressurized oxygen is fed. If the oxygen is added, a desired portion of the hydrocarbon gas can be burned to generate additional heat.

Although the device shown in FIGS. 6 and 7 is configured to handle solid hydrocarbon-containing material, it can be easily modified to handle heavy liquids (such as oil). For this modification, powder injectors 108 would be reduced in diameter near where they open into the surrounding gas stream. The pressure drop across these nozzles, combined with the substantial centrifugal acceleration of the spinning rotor, will finely distribute a liquid spray into the rapidly moving gas stream. Thus, the device shown can uniformly disperse a hydrocarbon-containing liquid into the gas stream in preparation for the acceleration/gasification tube.

The device shown in FIGS. 6 and 7 can also handle a slurry containing solids dispersed within a liquid. Slurries are often used to handle finely particulated solids, since such a slurry behaves like a liquid and can be handled by liquid handling equipment rather than conveyor belts and the like. As one example, a slurry of oil and finely ground carbon dispersed in oil can be fed into powder intake 88. The auger and powder injectors will handle such a slurry and disperse it into the stream of rapidly moving gas.

Although the specific hydrocarbon-containing examples of coal, shredded rubber, and crude oil were disclosed, the reader should keep in mind that the devices disclosed could be used to gasify virtually any type of hydrocarbon-containing liquid or solid. The preceding descriptions should not be construed, therefore, as limiting the scope of the invention but rather as providing illustrations of the preferred embodiments of the invention.

Having described our invention, we claim:

1. A device for converting hydrocarbon-containing solid material into a resultant hydrogen-containing gas, comprising:
   a. a gas supply, suppling hydrocarbon-containing gas;
   b. a solid supply, supplying hydrocarbon-containing solid;
   c. a solid injector, capable of dispersing said hydrocarbon-containing solid into said hydrocarbon-containing gas, in order to form a hydrocarbon mixture;
   d. an acceleration/gasification tube, including
      i. a first expansion nozzle for expanding and accelerating said hydrocarbon mixture, wherein said first expansion nozzle has an intake side and a discharge side, and wherein said intake side is connected to said solid injector so as to receive said hydrocarbon mixture from said solid injector;
      ii. an acceleration tube, having a first end and a second end, wherein said first end is connected to said discharge side of said first expansion nozzle;
      iii. a heat source heating said acceleration tube, and thereby heating said hydrocarbon mixture within said acceleration tube to convert a portion of said hydrocarbon mixture to said resultant hydrogen-containing gas;
   e. a diffuser, including a second expansion nozzle connected to said second end of said acceleration tube for receiving said resultant hydrogen-containing gas; and
   f. gas evacuating means connected to said diffuser, capable of rapidly evacuating said resultant hydrogen-containing gas from said diffuser in order to maintain a constant flow through said acceleration/gasification tube and said diffuser.

2. A device as recited in claim 1, wherein said diffuser includes a gas cooling jacket, circulating a cooling gas in order to cool said resultant hydrogen-containing gas traveling within said diffuser.

3. A device as recited in claim 1, wherein said diffuser includes a liquid cooling jacket, circulating a cooling liquid in order to cool said resultant hydrogen-containing gas traveling within said diffuser.

4. A device as recited in claim 1, wherein said heat source comprises at least one electric heating element.

5. A device as recited in claim 1, wherein said heat source comprises at least one gas burner.

6. A device as recited in claim 1, further comprising a filter connected between said diffuser and said gas evacuating means.

7. A device as recited in claim 1, wherein said gas evacuating means is a pump.

8. A device for converting hydrocarbon-containing liquid material into a resultant hydrogen-containing gas, comprising:
   a. a gas supply, suppling hydrocarbon-containing gas;
   b. a liquid supply, supplying hydrocarbon-containing liquid;
   c. a liquid injector, capable of dispersing said hydrocarbon-containing liquid into said hydrocarbon-containing gas, in order to form a hydrocarbon mixture;
   d. an acceleration/gasification tube, including
      i. a first expansion nozzle for expanding and accelerating said hydrocarbon mixture, wherein said first expansion nozzle has an intake side and a discharge side, and wherein said intake side is connected to said solid injector so as to receive said hydrocarbon mixture from said solid injector;
      ii. an acceleration tube, having a first end and a second end, wherein said first end is connected to said discharge side of said first expansion nozzle;
      iii. a heat source heating said acceleration tube, and thereby heating said hydrocarbon mixture within said acceleration tube to convert a portion of said hydrocarbon mixture to a resultant hydrogen-containing gas;
   e. a diffuser, including a second expansion nozzle connected to said second end of said acceleration tube for receiving said resultant hydrogen-containing gas; and
   f. gas evacuating means connected to said diffuser, capable of rapidly evacuating said resultant hydrogen-containing gas in order to maintain a constant flow through said acceleration/gasification tube and said diffuser.

9. A device as recited in claim 8, wherein said diffuser includes a gas cooling jacket, circulating a cooling gas in order to cool said resultant hydrogen-containing gas traveling within said diffuser.

10. A device as recited in claim 8, wherein said diffuser includes a liquid cooling jacket, circulating a cooling liquid in order to cool said resultant hydrogen-containing gas traveling within said diffuser.

11. A device as recited in claim 8, wherein said heat source comprises at least one electric heating element.

12. A device as recited in claim 8, wherein said heat source comprises at least one gas burner.

13. A device as recited in claim 8, further comprising a filter connected between said diffuser and said gas evacuating means.

14. A device as recited in claim 8, wherein said gas evacuating means is a pump.

15. A device for converting hydrocarbon-containing slurry material into a resultant hydrogen-containing gas, comprising:
   a. a gas supply, suppling hydrocarbon-containing gas;
   b. a slurry supply, supplying hydrocarbon-containing slurry;
   c. a slurry injector, capable of dispersing said hydrocarbon-containing slurry into said hydrocarbon-containing gas, in order to form a hydrocarbon mixture;
   d. an acceleration/gasification tube, including
      i. a first expansion nozzle for expanding and accelerating said hydrocarbon mixture, wherein said first expansion nozzle has an intake side and a discharge side, and wherein said intake side is connected to said solid injector so as to receive said hydrocarbon mixture from said solid injector;

ii. an acceleration tube, having a first end and a second end, wherein said first end is connected to said discharge side of said first expansion nozzle;

iii. a heat source heating said acceleration tube, and thereby heating said hydrocarbon mixture within said acceleration tube to convert a portion of said hydrocarbon mixture to a resultant hydrogen-containing gas;

e. a diffuser, including a second expansion nozzle connected to said second end of said acceleration tube for receiving said resultant hydrogen-containing gas; and f. gas evacuating means connected to said diffuser, capable of rapidly evacuating said resultant hydrogen-containing gas in order to maintain a constant flow through said acceleration/gasification tube and said diffuser.

16. A device as recited in claim 15, wherein said diffuser includes a gas cooling jacket, circulating a cooling gas in order to cool said resultant hydrogen-containing gas traveling within said diffuser.

17. A device as recited in claim 15, wherein said diffuser includes a liquid cooling jacket, circulating a cooling liquid in order to cool said resultant hydrogen-containing gas traveling within said diffuser.

18. A device as recited in claim 15, wherein said heat source comprises at least one electric heating element.

19. A device as recited in claim 15, wherein said heat source comprises at least one gas burner.

20. A device as recited in claim 15, further comprising a filter connected between said diffuser and said gas evacuating means.

21. A device as recited in claim 15, wherein said gas evacuating means is a pump.

* * * * *